United States Patent [19]

Hariharan et al.

[11] 4,235,505
[45] Nov. 25, 1980

[54] MULTI-COLOR HOLOGRAMS WITH WHITE-LIGHT ILLUMINATION

[75] Inventors: Parameswaran Hariharan, Turrumurra; Zoltan S. Hegedus, Manly; William H. Steel, Seaforth, all of Australia

[73] Assignee: Commonwealth Scientific and Industrial Research Organization, Canberra, Australia

[21] Appl. No.: 916,782

[22] Filed: Jun. 19, 1978

[30] Foreign Application Priority Data

Jun. 20, 1977 [AU] Australia .............................. PD0520

[51] Int. Cl.³ .............................................. G03H 1/30
[52] U.S. Cl. .................................. 350/3.77; 350/3.61; 350/3.80; 350/3.84; 350/3.86
[58] Field of Search .................... 350/3.61, 3.69, 3.75, 350/3.77, 3.78, 3.80, 3.81, 3.83, 3.84, 3.86

[56] References Cited

U.S. PATENT DOCUMENTS

| 3,442,566 | 5/1969 | Forward et al. | 350/3.61 |
| 3,514,176 | 5/1970 | Brooks et al. | 350/3.86 |
| 3,633,989 | 1/1972 | Benton | 350/3.69 |
| 3,695,744 | 10/1972 | Clay | 350/3.77 |
| 3,838,903 | 10/1974 | Leith et al. | 350/3.69 |
| 3,917,379 | 11/1975 | Noguchi | 350/3.77 |
| 3,924,925 | 12/1975 | Gale et al. | 350/3.77 |
| 3,947,085 | 3/1976 | Mottier | 350/3.69 |

FOREIGN PATENT DOCUMENTS 2435904   2/1975   Fed. Rep. of Germany .......... 350/3.80

OTHER PUBLICATIONS

Lin et al., "Multicolor Holographic Image Reconstruction. . .", *Bell Syst. Tech. Journal,* Apr. 1966, pp. 659-660.
Upatnieks et al., "Color Holograms for White Light Reconstruction", *Appl. Phys. Ltrs.,* vol. 8, No. 11, Jun. 1966, pp. 286-287.
Collier et al., *Optical Holography,* Academic Press, New York, 1971, pp. 494-522.
Burton et al., "Holographic Storage of Multicolor Information", *RCA Engineer,* vol. 18, No. 2, Aug./Sep. 1972, pp. 99-105.
Benton, "Holographic Displays-A Review", *Optical Engineering,* vol. 14, No. 5, Sep./Oct. 1975, pp. 402-407.
Cathey, *Optical Information Processing and Holography,* Wiley & Sons, New York, 1975, pp. 291-313.
Leith, "White-Light Holograms", *Scientific American,* Oct. 1976, pp. 80-95.
Marom et al., eds., *Applications of Holography and Optical Data Processing,* Pergamon Press, Oxford, 1976, pp. 401-409.

*Primary Examiner*—John K. Corbin
*Assistant Examiner*—John D. Lee
*Attorney, Agent, or Firm*—Fleit & Jacobson

[57] ABSTRACT

Transmission holograms which produce a multicolor image when illuminated by white light are prepared by making the hologram as a number of superimposed component holograms of images of a subject. The images are formed either by an optical imaging system of by separate primary holograms of the subject. Each primary hologram is formed using coherent light of one wavelength to be seen when viewing the final transmission hologram, and the primary hologram is illuminated with coherent light of that wavelength when providing its image for the component hologram. The use of a sandwich of two photosensitive media, each containing at least one component hologram, to form the product transmission hologram is also described.

11 Claims, 4 Drawing Figures

MULTI-COLOR HOLOGRAMS WITH WHITE-LIGHT ILLUMINATION

This invention concerns holograms which produce a three dimensional multicolour image when illuminated by white light and the method of producing such holograms.

Holograms have ceased to be a scientific curiosity and are finding practical applications. In developing hologram technology, several attempts have been made to produce holograms that will yield three dimensional images with white light illumination. Such techniques would avoid the restriction, inherent in the use of holographic imagery, to laser or other monochromatic illumination. Volume reflection holograms have provided one solution to this problem. A more recent development, reported by Stephen A. Benton of Polaroid Corporation in 1969 to the Optical Society of America and further described in his paper "Holographic Displays—A Review" which appeared in the September-/October 1975 issue of "Optical Engineering" (Volume 14, No. 5, pages 402-407) and in the October 1976 issue of "Scientific American", is the use of a two-step technique for producing a transmission hologram in which vertical parallax in viewing has been eliminated, and which permits viewing with white light illumination.

Benton's technique involves producing a primary hologram by conventional means (i.e., illuminating the subject of the hologram with coherent light, which is reflected to a photosensitive surface where it interferes with a reference beam from the same coherent light source), then using this hologram to produce a second, final hologram, having as its subject a real image of the original subject, projected by a narrow horizontal strip of the first, primary hologram. When the second, final hologram is illuminated with a monochromatic point source to reconstruct a real image of the original subject, the entire field of view can be seen when the eye is positioned at the image of the first, primary hologram.

An important feature of Benton's hologram is that if a point-like incandescent source is used to illuminate the final hologram, an eye at any height sees a bright image of the original subject in a very narrow range of wavelengths. As the eye is moved up or down, a series of sharp, essentially monochromatic, three-dimensional images is observed. For this reason, Benton's holograms have been referred to as "rainbow holograms".

Volume reflection holograms, comprising three superimposed recordings made at different wavelengths, which produce multicolour images, have been constructed (see, for example, the paper in the "Bell Systems Technical Journal", Volume 45, 1966, at page 659, by L. H. Lin, K. S. Pennington, G. W. Stroke and A. E. Labeyrie) but while their high wavelength selectivity permits illumination with white light, they have low diffraction efficiency. Another problem is emulsion shrinkage effects during processing, as a result of which the colours of the image differ from those of the original subject.

It is an objective of the present invention to produce transmission holograms which reconstruct bright three dimemsional multicolour images when illuminated with white light.

To achieve this objective, the present invention envisages the construction of a single multiplexed hologram consisting of two, three or more superimposed component holograms made with laser light of different wavelengths, particularly red, green and blue light.

More particularly, the present invention relates to the production of a transmission hologram which yields three dimensional multicolour images when illuminated with white light comprises a hologram made up of superimposed component holograms of images of a subject formed either by an optical imaging system or by a plurality of primary holograms of the subject, each component hologram having been formed with coherent light of a respective different wavelength.

To overcome problems associated with the recording of holograms with laser light of very different wavelengths in a single photosensitive medium, the final hologram of the present invention can conveniently be formed by a "sandwich" technique, using two or more separate photosensitive media which are optimised to record different regions of the spectrum, and which are subsequently brought into intimate contact.

The present invention provides a method of making a transmission hologram which will yield multicolour images of a subject when illuminated with white light, the method comprising recording successively in respective high resolution photosensitive media, a plurality of component holograms of images of the subject and a suitably positioned slit, each component hologram being formed using a coherent light source of a different wavelength to which the respective photosensitive media are sensitive, the reference beam geometry for all component holograms being the same and forming the respective photosensitive media with the recorded component holograms into a sandwich structure.

Normally the slit will be positioned between the subject and the photosensitive medium or media.

Still further according to the present invention, a method of producing a hologram which will yield multicolour images when illuminated with white light comprises the steps of:

(a) forming a plurality of primary holograms of a subject in respective photosensitive media, using coherent light of a different wavelength for each primary hologram, the subject remaining in the same position relative to the coherent light illumination, the reference beam and the photosensitive medium while each hologram is made; and (b) using each primary hologram in turn, forming a final hologram using real images produced by the primary holograms when illuminated by a beam of coherent light of the appropriate wavelength and of opposite convergence to the reference beam used in making the primary hologram, a beam of the same coherent light being used as a reference beam with each primary hologram to form the final hologram. In practice, three primary holograms using red, green and blue laser light, have been found to produce final holograms which yield useful tri-colour images.

Normally, in the second step of the method last defined above, a limiting slit will be placed over the collimating lens used for illuminating the primary hologram, or over the primary hologram itself, to eliminate vertical parallax. Also in the second step of the method last defined above, the reference beam used to record the final hologram is preferably convergent to ensure that when the final hologram is illuminated with a point source of white light, it forms real images of the subject as well as of the limiting slit at the appropriate position in the viewing space.

To further clarify the present invention and its various aspects, embodiments thereof will now be described with reference to the accompanying drawings, of which:

Figure 1:
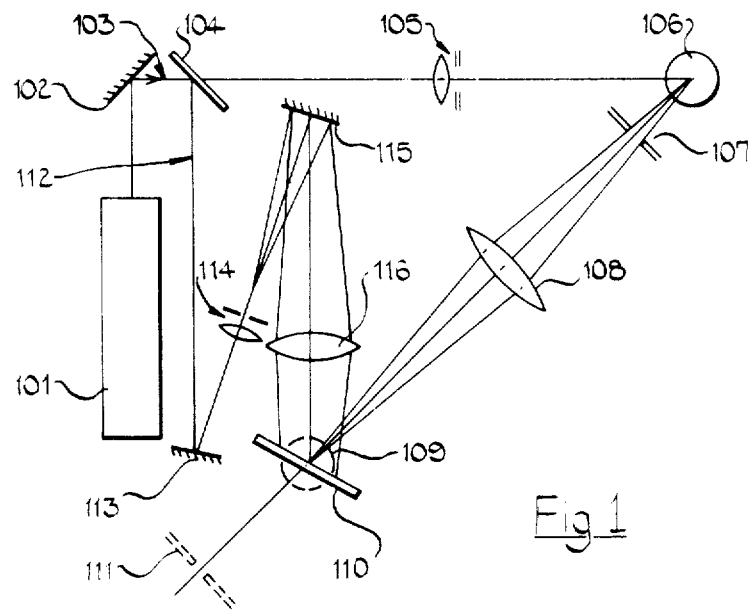
FIG. 1 is a schematic diagram of an optical system that may be used to make the hologram of the present invention.

Referring to FIG. 1, a laser 101 produces a beam of coherent light which is reflected by half-silvered mirror 104, then by mirrors 113 and 115, and made into a converging beam by lens-and-pinhole arrangement 114 and lens 116. The converging beam is incident upon a photosensitive plate 110, which also has incident upon it light reflected from subject 106 (which is illuminated with coherent light transmitted by half-silvered mirror 104 and spread into a divergent beam by lens-and-pinhole arrangement 105) which has been focussed into real image 109 of the subject by lens 108. Lens 108 has also formed a real image 111 of slit 107. Slit 107 is located between subject 106 and lens 108 with its long axis normal to the plane of the figure and effectively eliminates parallax in the image 109 in this plane (i.e., the vertical plane in the final viewing geometry). Those familiar with holography will recognise that by this technique, a hologram of the image 109 of the subject 106 and the image 111 of the slit 107 is created in photosensitive medium 110. Changing the laser 101 for another laser which produces coherent light of a different frequency from that of the original laser 101 will result in another hologram of the images 109 and 111 of the subject 106 and slit 107 being formed in photosensitive medium 110. Provided the photosensitive medium 110 has not been processed, two superimposed holograms will now have been formed.

In principle, any number of component holograms may be superimposed in medium 110. Provided the geometry of the system remains unchanged, the medium 110, when processed, will produce a final hologram which, when illuminated with white light, will produce a true multicolour image of the subject 106.

However, as described below, the lack of a suitable medium in which all the component holograms may be recorded requires the present invention to be practised by recording the component holograms on respective photosensitive media while maintaining the geometry of the system, a sandwich structure being formed to provide the final transmission hologram, as described below in more detail.

If mirror 102 is replaced by one or more half-silvered mirrors so that the beams from two or more lasers of suitable intensity are superimposed at 103, all the component holograms may be recorded simultaneously on the photosensitive medium 110.

Details of the lasers that may commonly be used in effecting the present invention, and of typical photosensitive media, will be given in the following description of the technique illustrated in FIGS. 2 and 3.

Figure 2:
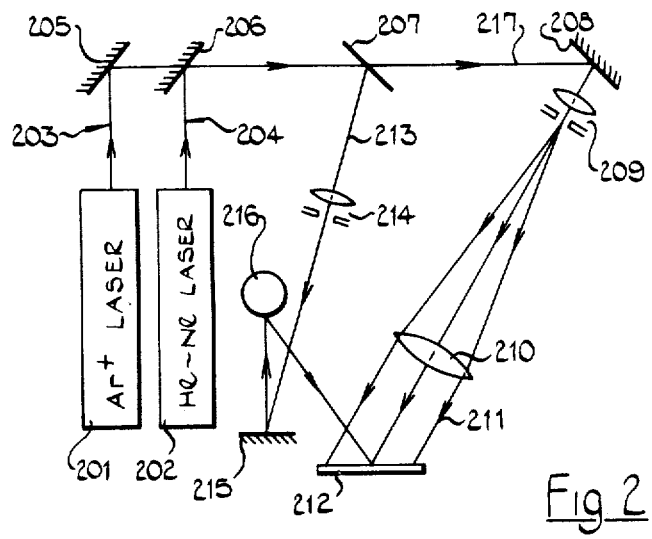
FIG. 2 illustrates an optical system set up to record the primary holograms of a subject in accordance with the second of the two methods defined above.

Referring now to FIG. 2, a hologram is prepared in a photosensitive medium 212, conveniently a photographic plate, using light from one of the two lasers 201, 202. If laser 201 is an argon ion laser and laser 202 is a helium-neon laser, the hologram will be, respectively, formed with blue or green light (at wavelengths of 488 nm or 515 nm) and red light (wavelength 633 nm). With the argon ion laser, holograms can be made with both blue and green light, separately, by tuning the laser to emit, in turn, light of one colour only. Wider ranges of colour in the final hologram can be obtained using other lasers as sources of coherent light. For example, a helium-cadmium laser produces blue light of wavelength 442 nm. With the lasers mentioned, the primary hologram recorded with red light can conveniently be formed in a red sensitive photographic plate, such as Agfa 10E75, and the primary holograms recorded with blue and green light can be formed in orthochromatic plates (for example, Agfa 10E56).

A primary hologram is formed with red light if laser 202 is operated to produce a beam of coherent light 204 which is reflected by mirror 206. The beam 217, which is transmitted through half-silvered mirror 207 and reflected from mirror 208, is made into a collimated beam 211 by lens-and-pinhole arrangement 209 and lens 210. The beam 213 reflected by half-silvered mirror 207 is focussed by lens 214 to illuminate, after reflection by mirror 215, the subject 216. Reflected light from subject 216 interferes with collimated beam 211, the interference pattern being recorded in the photosensitive emulsion 212 (in this example an Agfa 10E75 emulsion) which is supported on a glass backing plate. Processing the 10E75 emulsion thus exposed produces a primary hologram of the subject 216, illuminated with red light.

The procedure for forming primary holograms with blue and green light (or with light of another colour if laser 201 is other than an argon ion laser) is the same as above, except that mirror 206 is removed and the laser beam 203 is first reflected by mirror 205, and the emulsion 212 is, in this example, an orthochromatic emulsion, such as Agfa 10E56.

Figure 3:
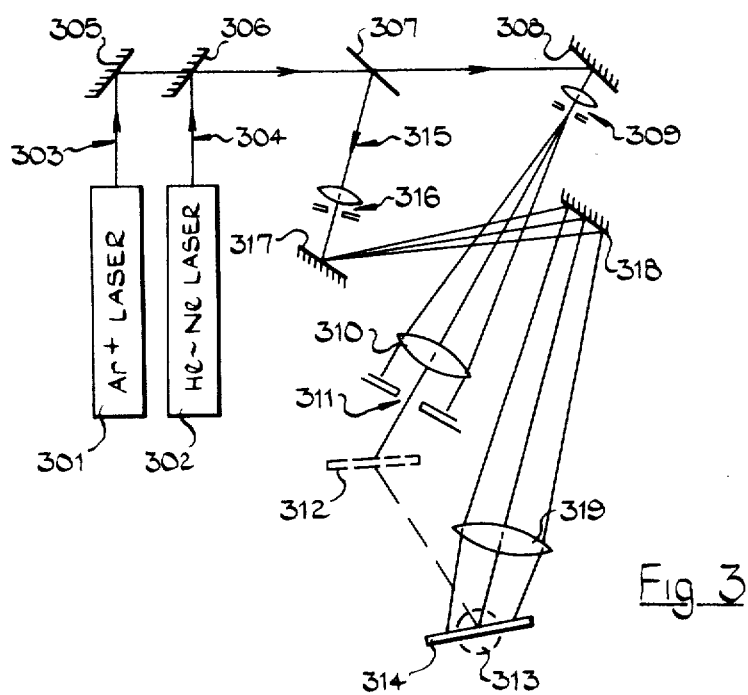
FIG. 3 depicts an optical system which is a modified form of the system of FIG. 2, and which may be used to make the final hologram in accordance with the second of the two methods defined above.

For the second stage of the production of a hologram of this invention, an optical system as shown schematically in FIG. 3 may be used. Each of the primary holograms 312 is illuminated in turn by coherent light from laser 301 or 302 of the same wavelength as that used to produce the hologram, reflected by mirror 308. In this way, a real image is created at 313. It will be apparent to those skilled in this art that the optical system of FIG. 3 is a modified version of the system of FIG. 2, with lasers 201, 202 unchanged and mirror 308 in the same position as mirror 208. Thus, since hologram 212 in FIG. 2 was produced with a collimated beam of light 211, it is only necessary to turn the hologram 212 through 180° about an axis normal to the plane of the figure and replace it in the same plate holder, to become primary hologram 313 of FIG. 3.

Using laser 302, half-silvered mirror 307 (corresponding in position to half-silvered mirror 207), mirrors 317 and 318, and lenses 316 and 319, a convergent beam of light is made to interfere with real image 313. A fresh hologram is now produced if an appropriate photosensitive medium (a plate with a suitable emulsion coating) is placed at 314. A limiting slit 311, approximately 1 cm wide (in the case of the equipment used by the present inventors) is placed over the collimating lens 310 with its long dimension normal to the plane of the figure. The use of slit 311 effectively eliminates parallax in the plane of the figure in the final hologram (i.e., vertical parallax in the final viewing geometry in practice).

Since the hologram 312 is illuminated in the reverse direction by the same collimated beam used to create it, the image projected at 313 will be undistorted. Maximum sharpness of the final image—i.e. that seen if the emulsion exposed at 314 is processed and illuminated with light of the same wavelength—is obtained if the image 313 straddles the emulsion at 314.

Following the first phase of the second stage just described, the mirror 306 is removed and this phase is repeated using laser 301 and its corresponding primary hologram 312, which could, in principle, be with the same emulsion at 314, unprocessed after its exposure providing the emulsion was an ideal material.

The ideal material for the photosensitive medium at 314 is a photosensitive emulsion which has a balanced sensitivity and exhibits low scattering at all the primary wavelengths used. It should also have a reasonable photosensitive speed. With such a material, the first phase of this second stage could be repeated as often as necessary to produce in a single emulsion a final hologram which is a super-position of component holograms recorded from the several primary holograms with light of appropriate wavelengths. No such ideal material appears to be available. The present inventors have produced, in an effective manner, transmission holograms in accordance with the invention by recording the component holograms in separate photosensitive media and then using a sandwich technique for forming the transmission hologram. The sandwich technique can be used with the method of final hologram preparation illustrated in FIG. 1.

Figure 4:
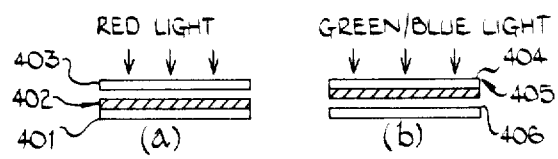
FIG. 4 is a schematic representation of the "sandwich technique" that may be used to make the final hologram.
Figure 4:
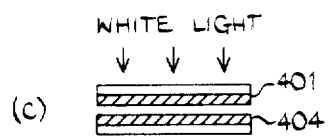

The sandwich technique can use two types of emulsions to form the final hologram. In carrying out the method of FIGS. 2 and 3, as shown in FIG. 4, the first phase of the second stage is carried out with red light using a red sensitive plate 401 (as already noted, as Agfa 10E75 emulsion on a glass plate is suitable for this purpose) which is loaded into a plate holder at 314 (in FIG. 3) with the emulsion 402 facing forward and a clear glass plate 403 of the same thickness in front of it. A hologram of the image projected by the primary hologram made with red light is then recorded. After this, holograms of the images projected by the primary holograms made with blue and green light are recorded on an orthochromatic plate 404 without an antihalation backing (Agfa 10E56, non AH, is suitable) loaded into the plate holder with its emulsion 405 facing backwards and with a clear glass plate 406 of the same thickness behind it. The individual exposures have to be adjusted by trial to bring the diffraction efficiencies of the component holograms made in this manner into balance. The two plates are then taped together with their emulsions in contact to give the final hologram. In practice, registration of the two plates is not critical; it is, in fact, automatic if the plate holder used to form the holograms at 314 (FIG. 3) is used as an assembly jig.

If the final hologram is illuminated by a point-like incandescent light source, all the component holograms making up the final hologram reconstruct images of the limiting slit in the respective colours with which the component holograms were made, in the same region of the viewing space. When the final hologram is viewed from this position, a multicolour three-dimensional reconstruction of the subject will be observed. Using such a hologram, with the subject a model painted so that different parts reflected light of wavelengths 633, 515 and 488 nm, the reconstructed image, when the final hologram was illuminated with light from a tungsten lamp, was found to have high colour saturation in the three primary colours and to be free of cross-modulation effects.

As with Benton's "rainbow" holograms, the colours of the component images change with the viewing angle in the vertical plane. This change can be utilised effectively in some types of displays. Where necessary, the degree of colour change can be kept within certain limits by optimisation of the length of the spectra projected into the viewing space, and by the use of suitable barriers to define the available range of viewing angles in the vertical plane.

We claim:

1. A method of making a transmission hologram which yields multicolour three dimensional images of a three dimensional subject when the transmission hologram is illuminated with white light, the method comprising the steps of:
   recording successively in respective high resolution photosensitive media a plurality of component holograms of images of the subject and a suitably positioned slit, each component hologram being formed using a coherent light source of a different wave length to which the respective photosensitive medium is sensitive, the reference beam geometry for all component holograms being the same, and
   forming the respective photosensitive media with recorded component holograms into a sandwich structure.

2. A method as claimed in claim 1, wherein the step of forming the sandwich structure, comprises bringing the photosensitive media into intimate contact in a stack.

3. A method as claimed in claim 1, wherein the step of recording comprises recording three component holograms corresponding to three primary colours.

4. A method as claimed in claim 1, wherein the photosensitive media are high resolution monochromatic photographic emulsions.

5. A method as claimed in claim 1, comprising the additional step of arranging said slit so as to eliminate vertical parallax in the hologram.

6. A method as claimed in claim 1, wherein said recording step comprises:
   (a) forming a plurality of primary holograms of the subject in respective high resolution primary photosensitive media using coherent light of a different wavelength for each primary hologram, and maintaining the reference beam geometry for the primary holograms the same; and
   (b) forming said component holograms of images of the subject by illuminating successively said primary holograms by beams of coherent light of the appropriate wavelength and opposite convergence to the reference beam used in making each of the primary holograms so as to produce real images from the primary holograms, and recording said real images on said high resolution photosensitive media to form component holograms for said transmission hologram; and
   (c) positioning said slit for eliminating parallax in a chosen plane.

7. A method as claimed in claim 6, comprising the step of positioning said slit so as to eliminate vertical parallax, a collimating lens being used for collimating the coherent light used to illuminate the primary hologram when forming said real image, and said slit being placed over the collimating lens.

8. A method as claimed in claim 6, comprising the step of placing said slit over each of said primary holograms to eliminate vertical parallax during recording of said plurality of component holograms.

9. A method as claimed in claim 6, wherein the reference beam is convergent during illumination of said primary holograms for recording the plurality of component holograms.

10. A transmission hologram produced by the method as claimed in claim 6.

11. A transmission hologram produced by the method as claimed in claim 1.

* * * * *